US012679071B2

(12) United States Patent
Eberhardt et al.

(10) Patent No.: US 12,679,071 B2
(45) Date of Patent: Jul. 14, 2026

(54) COMPONENT AND METHOD FOR PRODUCING A COMPONENT

(71) Applicant: ElringKlinger AG, Dettingen (DE)

(72) Inventors: Martin Eberhardt, Oberriet (CH); Silvio Koch, Weite (CH); Robert Witzgall, Reutlingen (DE); Harri Dittmar, Grunenbach (DE)

(73) Assignee: ElringKlinger AG, Dettingen (DE)

( * ) Notice: Subject to any disclaimer, the term of this patent is extended or adjusted under 35 U.S.C. 154(b) by 296 days.

(21) Appl. No.: 18/468,695

(22) Filed: Sep. 16, 2023

(65) Prior Publication Data

US 2024/0001643 A1     Jan. 4, 2024

Related U.S. Application Data

(63) Continuation of application No. PCT/EP2022/059890, filed on Apr. 13, 2022.

(30) Foreign Application Priority Data

Apr. 21, 2021     (DE) ..................... 10 2021 203 985.5

(51) Int. Cl.
B32B 15/20          (2006.01)
B32B 5/02          (2006.01)
(Continued)

(52) U.S. Cl.
CPC ................. B32B 15/20 (2013.01); B32B 5/02 (2013.01); B32B 15/085 (2013.01); B32B 15/14 (2013.01); B32B 27/32 (2013.01); B32B 37/04 (2013.01); B32B 37/06 (2013.01); H01M 50/119 (2021.01); H01M 50/121

(2021.01); H01M 50/124 (2021.01); H01M 50/129 (2021.01); H01M 50/159 (2021.01); H01M 50/16 (2021.01); H01M 50/164 (2021.01); B32B 2260/021 (2013.01); B32B 2260/046 (2013.01); B32B 2307/212 (2013.01); B32B 2307/7376 (2023.05); B32B 2311/24 (2013.01);
(Continued)

(58) Field of Classification Search
None
See application file for complete search history.

(56) References Cited

U.S. PATENT DOCUMENTS

2004/0209032 A1     10/2004   Wani et al.
2012/0003495 A1     1/2012   Cavaliere et al.
(Continued)

FOREIGN PATENT DOCUMENTS

DE       10 2011 016 757 A1     10/2012
DE       10 2012 103 149 A1     10/2013
(Continued)

*Primary Examiner* — Samir Shah
(74) *Attorney, Agent, or Firm* — ASLAN LAW, P.C.

(57)          ABSTRACT

The aim of the invention is to provide a component, preferably a component for a vehicle, which is as stable as possible and which has an optimized electromagnetic compatibility. This is achieved by providing a component comprising a base element, which comprises or is made of at least one composite element, and a shielding element for electrically and/or electromagnetically shielding the component, wherein the shielding element comprises or is made of one or more foils, for example one or more metal foils, and is connected to the base element.

10 Claims, 5 Drawing Sheets

(51) Int. Cl.

| | |
|---|---|
| *B32B 15/085* | (2006.01) |
| *B32B 15/14* | (2006.01) |
| *B32B 27/32* | (2006.01) |
| *B32B 37/04* | (2006.01) |
| *B32B 37/06* | (2006.01) |
| *H01M 50/119* | (2021.01) |
| *H01M 50/121* | (2021.01) |
| *H01M 50/124* | (2021.01) |
| *H01M 50/129* | (2021.01) |
| *H01M 50/159* | (2021.01) |
| *H01M 50/16* | (2021.01) |
| *H01M 50/164* | (2021.01) |
| *B62D 29/00* | (2006.01) |
| *B62D 29/04* | (2006.01) |

(52) U.S. Cl.
CPC ....... *B32B 2323/10* (2013.01); *B32B 2457/10* (2013.01); *B32B 2605/00* (2013.01); *B62D 29/008* (2013.01); *B62D 29/041* (2013.01)

(56) References Cited

U.S. PATENT DOCUMENTS

| | | |
|---|---|---|
| 2018/0370096 A1 | 12/2018 | Fuchs et al. |
| 2023/0057297 A1 | 2/2023 | Frauhofer |

FOREIGN PATENT DOCUMENTS

| | | | |
|---|---|---|---|
| DE | 10 2015 109 597 A1 | | 1/2017 |
| DE | 10 2020 204 360 A1 | | 10/2021 |
| WO | WO 2010/069921 A2 | | 6/2010 |
| WO | WO 2010/069921 A3 | | 6/2010 |
| WO | WO 2015/055419 A1 | | 4/2015 |
| WO | WO 2015055419 | * | 4/2015 |
| WO | WO 2020/016788 A1 | | 1/2020 |
| WO | WO 2021/156094 A1 | | 8/2021 |
| WO | WO 2021/156095 A1 | | 8/2021 |

* cited by examiner

COMPONENT AND METHOD FOR PRODUCING A COMPONENT

RELATED APPLICATION

This application is a continuation of international application No. PCT/EP2022/059890 filed on Apr. 13, 2022, and claims the benefit of German application No. 10 2021 203 985.5 filed on Apr. 21, 2021, which are incorporated herein by reference in their entirety and for all purposes.

FIELD OF DISCLOSURE AND BACKGROUND

The present invention relates to a component and a method for producing a component.

SUMMARY OF THE INVENTION

The object of the present invention is to provide a component which is as stable as possible and which has an optimized electromagnetic compatibility.

This object is achieved by a component in accordance with claim 1.

The component is preferably suitable for use in a vehicle, for example for use in an electric vehicle.

The component preferably comprises a base element, which comprises or is made of at least one composite element.

In particular, the component comprises a shielding element for electrically and/or electromagnetically shielding the component.

The shielding element preferably serves to shield the component from electrical and/or electromagnetic influences, for example from the outside.

In particular, the shielding element serves to increase the electromagnetic compatibility (EMC) of the component.

Electromagnetic compatibility preferably refers to the ability of a technical device, for example a housing containing the component, to not disturb other devices by undesirable electrical or electromagnetic effects or to not be disturbed by other devices.

For example, in the case of faults in battery modules, arc effects and/or electrical flashovers can occur, as a result of which holes can form in metallic components. This means failure to satisfy safety regulations.

It may be advantageous if the shielding element comprises or is made of one or more foils, for example one or more metal foils.

In comparison with components having additional metal volume parts, weight and installation space can thus be saved.

The shielding element is connected to the base element. For example, the shielding element and the base element are connected to one another in a bonded and/or force-locking and/or positive-locking manner.

For example, the base element is a carrier element.

Preferably, the base element is planar and/or at least approximately plate-shaped.

It may be provided that the component forms part of a housing, for example a part of a battery housing.

It may be favorable if the shielding element is arranged on an outer side facing away from an interior of a housing. The interior of the housing can thus be protected against interference by electrical and/or electromagnetic effects.

Each of the composite elements described in more detail below is preferably made of a material that comprises two or more materials connected together, wherein the composite element has material properties differing from those of the individual materials.

In the following, features and/or properties of a composite element (singular) are described to some extent. The corresponding description applies in embodiments in which the base element comprises a plurality of composite elements for one, several or all of the plurality of composite elements.

For example, it is conceivable that a low-weight reinforced thermoplastic (LWRT), a reinforced thermoplastic of low weight, is used as a composite element.

It may be advantageous if at least one of the at least one composite element comprises or is made of a polymer matrix material and a fiber material, preferably an endless fiber material and/or a long fiber material.

In embodiments in which the base element comprises a plurality of composite elements, it may be provided that the plurality of composite elements are composite elements that differ from one another.

For example, the composite elements have polymer matrix materials that are different from one another and/or fiber materials that are different from one another, for example as regards the type of fiber material and/or the fiber length.

An "endless fiber material" is preferably a fiber material in which 90% or more, in particular 95% or more, of the fibers have a length of approximately 40 mm or more, preferably approximately 50 mm or more.

A "long fiber material" is preferably a fiber material in which 90% or more, in particular 95% or more, of the fibers have a length of approximately 1 mm or more and/or of approximately 50 mm or less.

For example, the fiber material comprises glass fibers or is made of glass fibers.

Additionally or alternatively, it may be provided that the fiber material comprises or is made of aramid fibers and/or carbon fibers.

It may be provided that the composite element is produced from a fiber material pre-impregnated with the polymer matrix material, the fiber material being in particular completely or partially impregnated with polymer matrix material.

It may be favorable if the fiber material contained in the composite element comprises or is made of a woven fabric and/or a non-woven fabric.

A woven fabric is preferably a flat textile structure which preferably consists of at least two thread systems, the warp and the weft. In particular, the at least two thread systems are arranged in a pattern, for example they cross with inclusion of an angle of at least approximately 90°.

In particular when the fiber material contained in the composite element comprises or is made of a non-woven fabric, it may be provided that an angle between two or more thread systems is at least approximately 30° and/or at most approximately 90°, for example at least approximately 30°, at least approximately 45°, at least approximately or at least approximately 90°.

A non-woven fabric is preferably a flat structure which is formed from one or more layers of elongated threads extending in parallel. The threads are usually fastened at crossing points of the threads. Fastening is effected in particular either by material bonding or mechanically by friction and/or positive engagement. For example, the following types of non-woven fabrics exist:

monoaxial or unidirectional non-woven fabrics formed by fastening a group of parallel threads;

biaxial non-woven fabrics in which two groups of parallel threads are fastened in the direction of two axes;

multiaxial non-woven fabrics in which several groups of parallel threads are fastened in the direction of different axes.

The threads or thread systems preferably comprise or are made of one or more fibers. For example, the threads or thread systems are formed from one or more fiber bundles, for example so-called rovings.

It may be favorable if a proportion of the fibers in at least one of the at least one composite element is approximately 70% by weight or more, in particular approximately 80% by weight or more, in relation to a total mass of the respective composite element.

In particular, the proportion of the fibers in at least one of the at least one composite elements is approximately 95% by weight or less, for example approximately 92% by weight or less, in relation to the total mass of the respective composite element.

It may be favorable if the composite element is adhesion-promoter-free. Preferably, this results exclusively in a partial impregnation of the fiber material with the polymer matrix material. As a result, the composite element has in particular improved impact properties.

The composite element preferably forms an organic sheet. In a particularly preferred adhesion-promoter-free embodiment, the polymer matrix material is a thermoplastic polymer material.

An "adhesion-promoter-free" composite element preferably contains no substances that are provided to produce a physical and/or chemical bond at an interface of immiscible substances.

In particular, the composite element is free of silanes, for example aminosilanes.

For example, the organic sheet is reversibly deformable. The organic sheet can thus be used several times.

As a result of incomplete impregnation, fibers can slip in a load case and are not held in a fixed position. As a result, additional energy can in particular be absorbed, which can be additionally dissipated, for example, by friction effects.

In particular, forces can be reliably conducted from the fibers of the respective fiber material into the polymer matrix material and/or from the polymer matrix material into the fibers.

In contrast, complete impregnation of the fibers typically prevents slipping under load, so that in comparison with structures whose fibers are not completely impregnated, less energy is absorbed and/or the structure tears.

Adhesion-promoter-free composite elements can, for example, be formed as and/or be organic sheeting. Organic sheets are in particular suitable for multi-layer structures, for example sandwich elements. For example, asymmetrical sandwich elements are formed.

For example, the sandwich element can replace usually used metal components.

Adhesion-promoter-free composite elements can be produced by the same methods and/or in the same installations as composite elements containing adhesion promoters. As a result, conversion measures are not needed in the installations in the event of a change of method.

For example, the composite element has an energy absorption of 100% or more. The energy absorption is determined, for example, in accordance with a puncture test in accordance with DIN EN ISO 6603-2. The adhesion-promoter-free composite element in the form of an organic sheet preferably cannot be punctured in accordance with the puncture test in accordance with DIN EN ISO 6603-2.

Thermoplastic polymer matrix materials have, in particular, the advantage over thermosetting polymer materials that they have an increased elongation at break compared to other polymer materials.

For example, an energy absorption capacity of composite elements comprising a thermoplastic polymer matrix material is increased up to a factor of 10 in comparison with the energy absorption capacity of composite elements comprising a thermosetting polymer matrix material.

The energy absorption capacity of a composite element which is adhesion-promoter-free and comprises a thermoplastic polymer matrix material is preferably greater by a factor of 3 or more and/or 4 or less than the energy absorption capacity of a composite element which comprises an adhesion promoter and comprises a thermoplastic polymer matrix material.

In particular for an optimized shielding effect, it can be favorable if the shielding element comprises or is made of aluminum or an aluminum alloy.

The shielding element preferably has an average thickness of approximately 0.02 mm or more, in particular approximately 0.4 mm or more, for example approximately 0.5 mm or more.

In particular, the shielding element has an average thickness of approximately 1.2 mm or less, for example 1.0 mm or less.

In accordance with a preferred embodiment, it may be provided that the shielding element has an average thickness in a range of approximately 0.02 mm to approximately 0.05 mm.

Thickness is preferably defined along a direction extending at least approximately perpendicularly to a main extension plane of the component.

The average thickness preferably refers to an average material thickness.

It may be provided that the average thickness of the shielding element is selected as a function of an electromagnetic compatibility that is to be achieved. The greater the electromagnetic compatibility required of the component, the greater the average thickness of the shielding element will be set.

It may be advantageous if the shielding element is fastened to the base element via a connecting element of the component and/or by means of a connecting element of the component. For example, the connecting element is an adhesive layer and/or bonding layer.

It may be favorable if the connecting element comprises or is made of a first polymer material. Preferably used for the connecting element is a first polymer material which has a melting point which is approximately 10% or more, in particular approximately 20% or more, for example approximately 30% or more, higher than a melting point of a polymer matrix material contained in one or all of the composite elements.

In accordance with a preferred embodiment, it may be provided that the connecting element comprises or is made of a first polymer material, the first polymer material preferably comprising or being made of a thermoplastically processable polymer material.

In particular, the thermoplastically processable polymer material comprises or is made of a random copolymer, for example a random copolymer polypropylene.

A copolymer is preferably a polymer which consists of two or more different types of monomer units. For example, in a random copolymer, the different types of monomer units are randomly distributed in polymer chains.

A PP-R (polypropylene random copolymer) has proven to be particularly suitable as a random copolymer. For example, a copolymer of propylene and ethylene is used as the first polymer material.

It may be advantageous if the first polymer material is a low-melting polymer material. For example, a melting point of the first polymer material is approximately 140° C. or less, for example approximately 135° C. or less.

In particular, the melting point of the first polymer material is approximately 110° C. or more, for example approximately 120° C. or more.

Preferably, in combination with the connecting element, which comprises or is made of the random copolymer, a composite element is used which comprises or is made of the corresponding homopolymer.

For example, a composite element is used in which a polypropylene homopolymer is used as the polymer matrix material. The polypropylene homopolymer has, for example, a melting point of approximately 164° C.

It may be favorable if the component is a part of a housing of a battery module, for example a cover element of a battery module.

Additionally or alternatively, the component is preferably a part of a housing of a battery cell, for example a cover element of a battery cell.

Additionally or alternatively, it may be provided that the component is a vehicle underbody or a part thereof. For example, the component forms a cladding of a vehicle underbody or a part thereof.

It may be advantageous if the base element is a sandwich element comprising a first layer element, a second layer element and a core element, wherein the core element is arranged between the first layer element and the second layer element.

The first layer element preferably comprises or is made of a first composite element. In particular, the first layer element is an adhesion-promoter-free composite element, for example an organic sheet.

In an assembled state, the first layer element is preferably arranged on a side of the sandwich element facing a compressive load.

It can be favorable if the second layer element comprises or is made of a second composite element. The second composite element preferably comprises endless fibers arranged parallel to one another. For example, the second composite element is a unidirectional fiber tape.

It may be advantageous if the core element comprises or is made of a third composite element. The third composite element is, for example, a direct long-fiber-reinforced thermoplastic material (a so-called "direct long-fiber thermoplastic" (DLFT) material).

A direct long-fiber-reinforced thermoplastic material is preferably a long-fiber-reinforced material that is produced in a direct method. In the case of direct methods for producing long-fiber-reinforced thermoplastic components, the use of energy-intensive and cost-intensive intermediate stages (semi-finished products) is dispensed with in particular. A molding compound which is to be processed by compression molding or injection molding to form the finished component is preferably produced immediately before its processing. In this case, the fiber content, additives and the polymer matrix material can be variably determined and the resulting material can thus be optimally tailored with respect to its later application.

It may be advantageous if the base element is a sandwich element which comprises or is made of a separating layer element, a first layer element and a second layer element, wherein the separating layer element is arranged between the first layer element and the second layer element. The sandwich element preferably comprises a third layer element and/or a fourth layer element. The third layer element is arranged, for example, on a side of the first layer element facing away from the separating layer element. The fourth layer element is arranged, for example, on a side of the second layer element facing away from the separating layer element.

The separating layer element is preferably a foil, in particular a substantially diffusion-resistant foil. The separating layer element preferably comprises or is made of one or more of the following materials: polyolefin, for example polypropylene, thermoplastic elastomer, ethylene-propylene-diene rubber.

An element, in particular an element with an sa value of 1500 m or more, is preferably referred to as "diffusion-resistant." The sa value is determined in particular in accordance with DIN 4108-3 (October 2018).

By means of the separating layer element, an improved seal can be formed even during processing, for example production and/or assembly of the component. For example, due to the separating layer element, the component has an improved cooling behavior and/or an optimized resistance to mechanical stresses.

For example, it is conceivable that the component is a semi-finished product and/or is manufactured in-line.

The first layer element preferably comprises or is made of a first composite element. For example, the first layer element comprises a non-woven material and a fiber material. In accordance with a preferred embodiment, the first layer element is a polypropylene non-woven material with a glass-fiber core.

The second layer element preferably comprises a non-woven material, for example, in particular, a polyester, for example polyethylene terephthalate, or a polyolefin, for example polypropylene or mixtures thereof. It may be advantageous if the second layer element is fiber-free.

The third layer element is, for example, a foil made of a non-woven material.

For example, the fourth layer element is a scrim material and/or an adhesive material. A scrim material is preferably a woven material, for example a gauze material.

One or more of the following elements can have a non-combustible and/or fire-retardant component or can be designed to be completely non-combustible and/or fire-resistant:

the shielding element; and/or
the first layer element; and/or
the second layer element; and/or
the separating layer element; and/or
the third layer element; and/or
the fourth layer element.

The third layer element and/or the fourth layer element are, for example, outer layers. In particular, the third layer element and/or the fourth layer element serve to functionalize the component, for example with regard to one or more of the following properties and/or functions: sealing, acoustics, adhesive bonding.

In accordance with a preferred embodiment, it may be provided for the shielding element to comprise a plurality of foils, for example in the form of a foil package. A number of foils may vary depending on the requirements on the component, for example with respect to temperature and/or electromagnetic compatibility.

It may be provided that the plurality of foils are not flat. For example, the plurality of foils have regularly arranged elevations and/or depressions in directions extending per-
pendicularly to a main extension plane of the respective foil.

For example, the plurality of foils in each case have
regularly arranged bulges.

The component is preferably recyclable and/or suitable
for end-of-life recycling.

The present invention also relates to a method for pro-
ducing a component.

The invention in this respect is based on the object of
providing a method by means of which a component that is
as stable as possible can be produced as simply as possible,
said component having an optimized electromagnetic com-
patibility.

According to the invention, this object is achieved by a
method according to the independent method claim.

In particular, a component in accordance with the inven-
tion can be produced with the method in accordance with the
invention.

Preferably, a base element is provided which comprises or
is made of at least one composite element.

The method further comprises, in particular, fastening to
the base element a shielding element for electrically and/or
electromagnetically shielding the component, wherein the
shielding element comprises or is made of one or more foils,
for example one or more metal foils.

For example, the shielding element is fastened to the base
element in a bonded and/or force-locking and/or positive-
locking manner.

It may be favorable if the shielding element is fastened to
the base element via a connecting element, wherein a
material of the connecting element, for example a first
polymer material, is preferably fused and/or melted on by
means of a heating device, for example an infrared heating
device, whereby in particular a material bond is formed
between the first material of the connecting element and the
composite element of the base element and a material bond
is formed between the material of the connecting element
and the shielding element.

For example, the shielding element is coated with a
connecting element and directly back compression molded.

The shielding element can preferably also be detached
from the base element again, for example in a recycling
process.

In particular, the shielding element is heated, for example
on one side from a side facing away from the base element,
by means of a heating device until the connecting element
becomes low-viscous but the properties of the base element
remain substantially unchanged. Subsequently and/or mean-
while, the shielding element is preferably detached from the
base element.

In order to detach the shielding element from the base
element, the shielding element in a low-viscous state is
preferably removed, for example by suction, by means of a
suction device, for example a vacuum suction device. In this
way, end-of-life recycling can take place.

"Low-viscous" is preferably understood to mean a vis-
cosity η of the corresponding material in the heated state, for
example of approximately 145° C. to approximately 150°
C., of approximately 0.8 mPa·s to approximately 10 mPa·s.

It may be favorable if a thermoplastic material is applied
to the at least one composite element of the base element, for
example by injection molding or compression molding.

For example, the base element is trimmed. In this way, an
optimized tightness at the edges can be formed.

In accordance with a preferred embodiment, it may be
provided that the shielding element comprises a plurality of
foils, the plurality of foils being heated together, in particular together with the base element, and that the plurality of foils
and in particular the base element are formed as a composite.
In this way, the component can be manufactured on-line.

For example, the shielding element is fastened to the base
element by one or more of the following techniques:

riveting; and/or gluing; and/or stapling; and/or joining, for example, toxing and/or crimping.

By means of the techniques mentioned, the component
can be produced off-line.

Further preferred features and/or advantages of the inven-
tion form the subject-matter of the following description and
the drawings illustrating exemplary embodiments.

BRIEF DESCRIPTION OF THE DRAWINGS

Identical or functionally identical elements are denoted by
the same reference numerals in all figures.

DETAILED DESCRIPTION OF THE DRAWINGS

Figure 1:
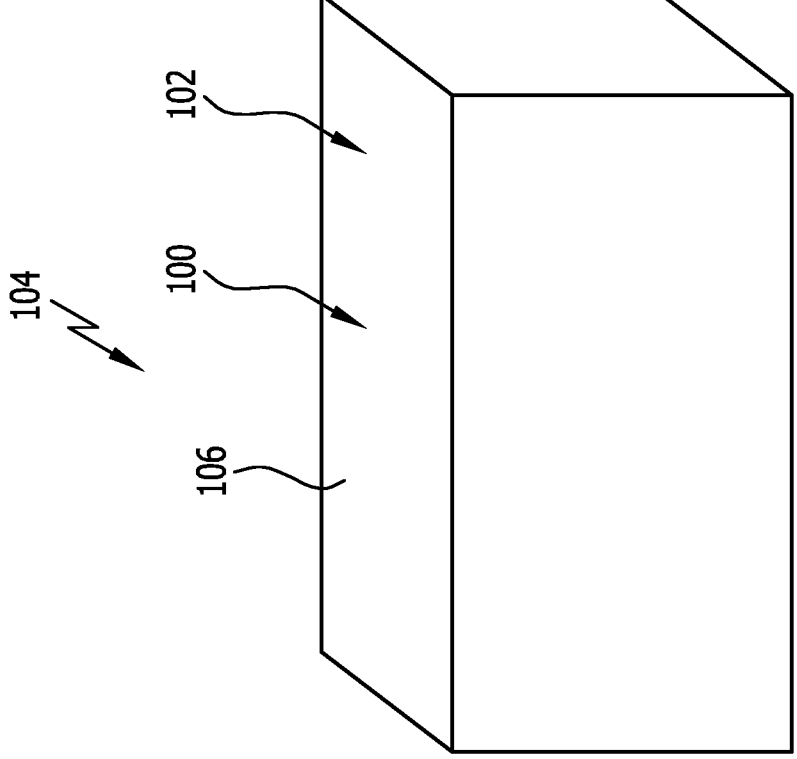
FIG. 1 shows a schematic perspective view of a battery
module which contains an embodiment of a component that
contains a base element and a shielding element, the shield-
ing element being formed by a metal foil.

FIG. 1 shows a component denoted as a whole by 100.
The component 100 preferably forms a component of a
housing 102 of a battery module 104, for example a battery
box. In particular, the component 100 forms a cover element
106 of the battery module 104.

The component 100 preferably comprises a base element
108 which comprises or is made of at least one (in the
present case exactly one) composite element 110.

In particular, the component 100 comprises a shielding
element 112 for electrical and/or electromagnetic shielding.

The shielding element 112 preferably serves to shield an
interior of the battery module 104 from electrical and/or
electromagnetic influences, for example from the outside.

In particular, the shielding element 112 improves an
electromagnetic compatibility of the component 100 and/or
of the battery module 104 as a whole.

Electromagnetic compatibility preferably refers to the
ability of a technical device, for example of the housing 102
which contains the component 100, not to disturb other
devices by unwanted electrical or electromagnetic effects or
not to be disturbed by other devices.

It may be advantageous if the shielding element 112 comprises or is made of one or more foils 114, for example one or more metal foils 115.

The shielding element 112 is connected to the base element 108. For example, the shielding element 112 and the base element 108 are connected to one another in a bonded and/or force-locking and/or positive-locking manner.

The base element 108 preferably forms a carrier element 116 for the shielding element 112.

The base element 108 is preferably planar and/or at least approximately plate-shaped.

It may be favorable if the shielding element 112 is arranged on an outer side of the housing 102 facing away from an interior of the housing 102. The interior of the housing 102 and in particular components contained therein can thus be protected against interference caused by electrical and/or electromagnetic effects.

The battery module 104 is in particular suitable for use in a vehicle (not shown in the drawing), for example an electric vehicle.

In addition or as an alternative to the housing 102 of a battery module 104 being formed partially or completely by a component 100, it may be provided that part of a housing of one or more battery cells of the battery module 104 is formed by a component. For example, the cover element of one or more battery cells is formed by a component 100 (not shown in the drawing).

Additionally or alternatively, it may be provided for an underbody (not shown in the drawings) of the vehicle (a vehicle underbody) to be partially or completely formed by a component 100. For example, the component 100 forms a cladding of a vehicle underbody or a part thereof.

The composite element 110 preferably comprises or is made of a polymer matrix material and a fiber material. The fiber material is preferably an endless fiber material and/or a long fiber material.

An "endless fiber material" is preferably a fiber material in which 90% or more, in particular 95% or more, of the fibers have a length of approximately 40 mm or more, preferably approximately 50 mm or more.

A "long fiber material" is preferably a fiber material in which 90% or more, in particular 95% or more, of the fibers have a length of approximately 1 mm or more and/or of approximately 50 mm or less.

For example, the fiber material comprises glass fibers or is made of glass fibers.

Additionally or alternatively, it may be provided that the fiber material comprises or is made of aramid fibers and/or carbon fibers.

Figure 2:
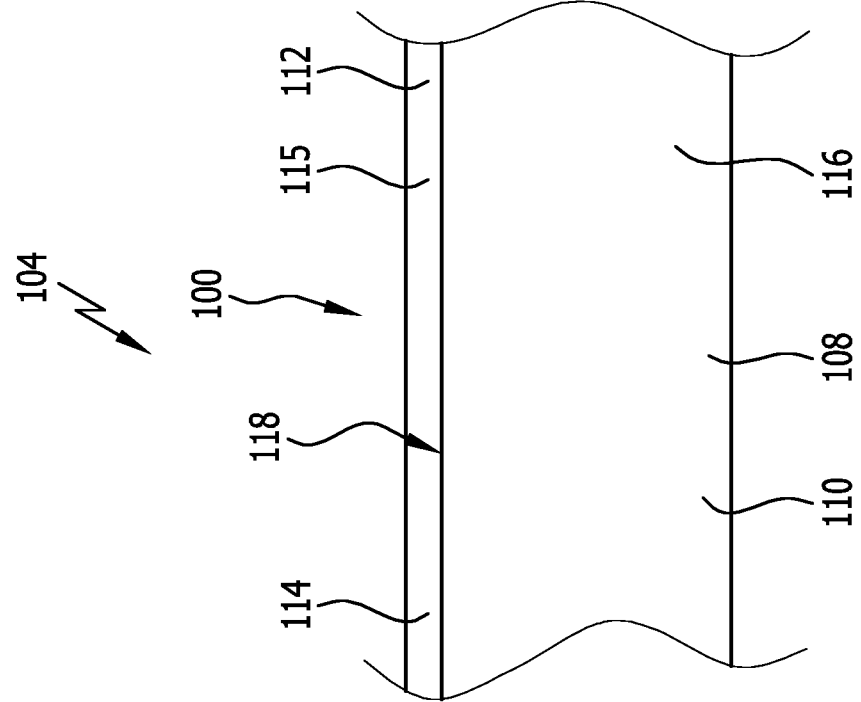
FIG. 2 shows a detail of a schematic sectional view of the
component from FIG. 1 through a plane extending parallel
to a main extension plane of the component.

In accordance with the embodiment shown in FIGS. 1 and 2, a homopolymer, for example a polypropylene homopolymer, is, for example, used as the polymer matrix material.

For example, it is also conceivable that a low-weight reinforced thermoplastic (LWRT) is used as the composite element 110.

It may be provided that the composite element 110 is produced from the fiber material pre-impregnated with the polymer matrix material, the fiber material being in particular completely or partially impregnated with polymer matrix material.

It may be favorable if the fiber material contained in the composite element 110 comprises or is made of a woven fabric and/or a non-woven fabric.

A woven fabric is preferably a flat textile structure which preferably consists of at least two thread systems, the warp and the weft. In particular, the at least two thread systems are arranged in a pattern, for example they cross with inclusion of an angle of at least approximately 90°.

In particular when the fiber material contained in the composite element 110 comprises or is made of a non-woven fabric, it may be provided that an angle between two or more thread systems is at least approximately 30° and/or at most approximately 90°, for example at least approximately 30°, at least approximately 45°, at least approximately 60° or at least approximately 90°.

The threads or thread systems preferably comprise or are made of one or more fibers. For example, the threads or thread systems are formed from one or more fiber bundles, for example so-called rovings.

It may be favorable if a proportion of the fibers in the composite element 110 is approximately 70% by weight or more, in particular approximately 80% by weight or more, in relation to a total mass of the composite element 110.

In particular, the proportion of the fibers in the composite element 110 is approximately 95% by weight or less, for example approximately 92% by weight or less, in relation to the total mass of the composite element 110.

In particular for an optimized shielding effect, it may be favorable if the shielding element 112 comprises or is made of aluminum or an aluminum alloy.

The shielding element 112 preferably has an average thickness of approximately 0.02 mm or more, in particular approximately 0.4 mm or more, for example approximately 0.5 mm or more.

In particular, the shielding element 112 has an average thickness of approximately 1.2 mm or less, in particular 1.0 mm or less.

In accordance with a preferred embodiment, it may be provided that the shielding element 112 has an average thickness in a range of approximately 0.02 mm to approximately 0.05 mm.

The thickness is preferably defined along a direction extending at least approximately perpendicularly to a main extension plane of the component 100.

The average thickness preferably refers to an average material thickness of the respective element.

It may be provided that the average thickness of the screening element 112 is selected as a function of an electromagnetic compatibility that is to be achieved. The greater the electromagnetic compatibility required of the component 100, the greater the average thickness of the shielding element 112 will be set and/or selected.

It may be advantageous if the shielding element 112 is fastened to the base element 108 via a connecting element 118 of the component 100. The connecting element 118 is, for example, an adhesive layer and/or bonding layer.

It may be favorable if the connecting element 118 comprises or is made of a first polymer material. Preferably used for the connecting element 118 is a first polymer material which has a melting point which is approximately 10% or more, in particular approximately 20% or more, for example approximately 30% or more, higher than a melting point of a polymer matrix material of the composite element 110.

In accordance with a preferred embodiment, it may be provided that the first polymer material of the connecting element 118 comprises or is made of a thermoplastically processable polymer material. The thermoplastically processable polymer material preferably comprises or is made of a random copolymer, for example a random copolymer polypropylene.

A copolymer is preferably a polymer which consists of two or more different types of monomer units. For example, in a random copolymer, the different types of monomer units are randomly distributed in polymer chains.

It may be advantageous if the first polymer material is a low-melting polymer material. For example, a melting point of the first polymer material is approximately 140° C. or less, for example approximately 135° C. or less.

In particular, the melting point of the first polymer material is approximately 110° C. or more, for example approximately 120° C. or more.

In accordance with a preferred embodiment, a random copolymer is used as the first polymer material and the corresponding homopolymer is used as the polymer matrix material of the composite element 110.

A PP-R polypropylene random copolymer has proven to be particularly suitable as random copolymer. For example, a copolymerizate of propylene and ethylene is used as the first polymer material of the connecting element 118.

In order to produce the component 100, the shielding element 112 is preferably fastened to the base element 108.

In particular, the shielding element 112 is firmly bonded to the base element 108, for example by and/or via the connecting element 118.

A material of the connecting element 118, for example a first polymer material, is preferably fused and/or melted on by means of a heating device. In particular by fusing and/or melting on the material of the connecting element 118, a material bond is formed between the material of the connecting element 118 and the composite element 110 of the base element 108 and a material bond is formed between the material of the connecting element 118 and the shielding element 112.

An infrared heating device, for example an infrared emitter, is used as the heating device, for example.

The shielding element 112 can preferably also be detached again from the base element 108, for example in a recycling process.

In particular, the shielding element 112 is heated by means of the heating device, for example on one side from a side facing away from the base element 108, until the connecting element 118 becomes low-viscous, but the properties of the base element 108 remain essentially unchanged.

After and/or during the heating of the connecting element 118, the shielding element 112 is preferably detached from the base element 108.

In order to detach the shielding element 112 from the base element 108, the shielding element 108 in a low-viscosity state is preferably removed, for example by suction, by means of a suction device, for example a vacuum suction device.

"Low-viscous" is preferably understood to mean a viscosity $\eta$ of the corresponding element in the heated state, for example of approximately 145° C. to approximately 150° C., of approximately 0.8 mPa·s to approximately 10 mPa·s.

Figure 3:
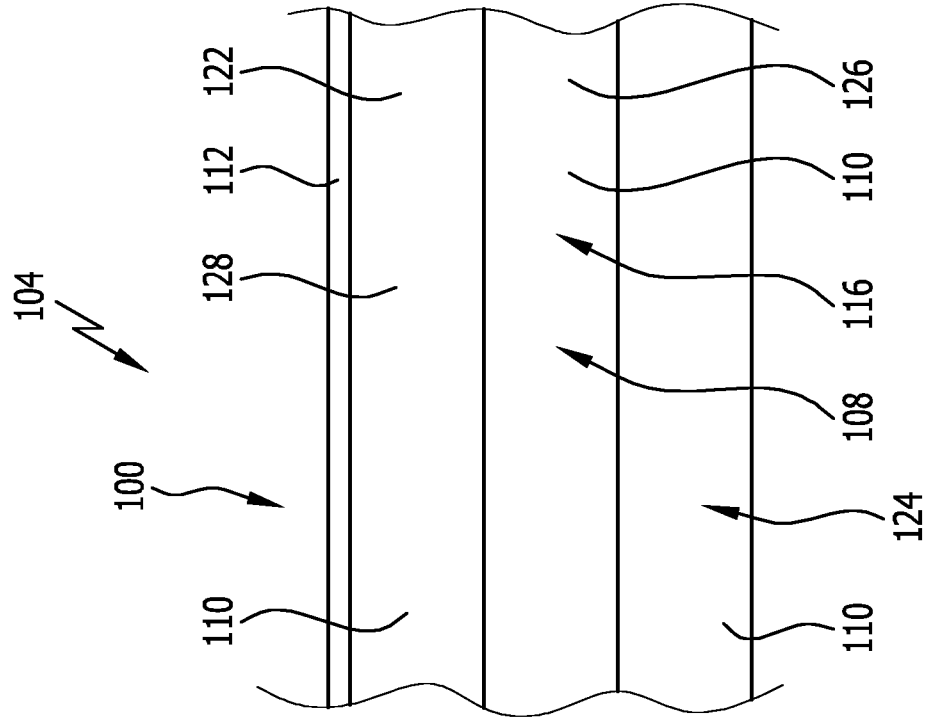
FIG. 3 shows a detail of a schematic sectional view of a
further embodiment of a component, in which the base
element is or comprises a sandwich element, wherein the
sandwich element comprises a first layer element, a second
layer element and a core element arranged between the first
layer element and the second layer element.

A further embodiment of a component 100 shown in FIG. 3 differs substantially in its structure and function from the embodiment shown in FIGS. 1 and 2 in that the base element 108 comprises a plurality of composite elements 110.

It may be favorable if the base element 108 comprises or is a sandwich element 120. The sandwich material 120 preferably comprises a first layer element 122, a second layer element 124 and a core element 126 arranged between the first layer element 122 and the second layer element 124.

A first composite material 110 in the form of an organic sheet 128 is preferably used as the first layer element 122.

For example, an asymmetrical sandwich element 120 is formed in which materials that are different from one another are used as the first layer element 122 and as the second layer element 124.

In accordance with the embodiment shown, it may be provided that the first composite element 110 is adhesion-promoter-free. For example, only partial impregnation of the fiber material with the polymer matrix material is thus effected. As a result, the first composite element 110 in particular has improved impact properties.

In a particularly preferred adhesion-promoter-free embodiment, the polymer matrix material is preferably a thermoplastic polymer material.

The "adhesion-promoter-free" composite element 110 preferably contains no substances that are provided to produce a close physical and/or chemical bond at an interface of immiscible substances. For example, the first composite element 110 is free of silanes, for example aminosilanes.

For example, the organic sheet 128 is reversibly deformable. The organic sheet 128 can thus be used several times.

As a result of incomplete impregnation of the fiber material, fibers can slip in a load case and not be held in a fixed position. As a result, additional energy can in particular be absorbed, which can be additionally dissipated, for example, by friction effects.

In particular, forces can be reliably conducted from the fibers of the respective fiber material into the polymer matrix material and/or from the polymer matrix material into the fibers.

In contrast, complete impregnation of the fibers typically prevents slipping under load, so that in comparison with structures whose fibers are not completely impregnated, less energy is absorbed and/or the structure tears.

Adhesion-promoter-free composite elements 110 can be produced by the same methods and/or in the same installations as composite elements 110 which contain adhesion promoters. As a result, conversion measures are not needed in the installations in the event of a change of method.

For example, the first composite element 110 has an energy absorption of 100% or more. The energy absorption is determined, for example, in accordance with a puncture test in accordance with DIN EN ISO 6603-2. The adhesion-promoter-free first composite element 110 in the form of an organic sheet 128 preferably cannot be punctured in accordance with the puncture test in accordance with DIN EN ISO 6603-2.

Thermoplastic polymer matrix materials have, in particular, the advantage over thermosetting polymer materials that they have an increased elongation at break compared to other polymer materials.

For example, an energy absorption capacity of the first composite element 110 comprising a thermoplastic polymer matrix material is increased up to a factor of 10 in comparison with the energy absorption capacity of composite elements 110 comprising a thermosetting polymer matrix material.

The energy absorption capacity of the first composite element 110 which is adhesion-promoter-free and comprises a thermoplastic polymer matrix material is preferably greater by a factor of 3 or more and/or 4 or less than the energy absorption capacity of a composite element 110 which comprises an adhesion promoter and comprises a thermoplastic polymer matrix material.

It may be favorable if a thermoplastic material is applied to the at least one composite element 110 of the base element 108, for example by injection molding or compression molding.

For example, the base element 108 is trimmed.

In this way, an optimized tightness at the edges can be formed.

In an assembled state, the first layer element 122 is preferably arranged on a side of the component 100 facing a compressive load. For example, the first layer element 122 is arranged on a side of the sandwich element 120 facing the shielding element 112.

It may be favorable if the second layer element 124 comprises or is made of a second composite element 110. For example, the second composite element 110 is a composite element 110 which comprises endless fibers arranged parallel to one another. In accordance with a preferred embodiment, the second layer element 124 is a unidirectional fiber tape (UD tape).

It may be advantageous if the core element 126 comprises or is made of a third composite element 110. The third composite element 110 is, for example, a direct long-fiber-reinforced thermoplastic material (a so-called "direct long-fiber thermoplastic" (DLFT) material).

A direct long-fiber-reinforced thermoplastic material is preferably a long-fiber-reinforced material that is produced in a direct method. In the case of direct methods for producing long-fiber-reinforced thermoplastic components, the use of energy-intensive and cost-intensive intermediate stages (semi-finished products) is dispensed with in particular. The molding compound which is to be processed by compression molding or injection molding to form the finished component is, for example, produced immediately before its processing. In this case, the fiber content, additives and the polymer matrix material can be variably determined and the material can thus be optimally tailored to its later application.

Otherwise, the further embodiment shown in FIG. 3 corresponds substantially in its structure and function to the embodiment shown in FIGS. 1 and 2 so that reference is made to their description in this respect.

Figure 4:
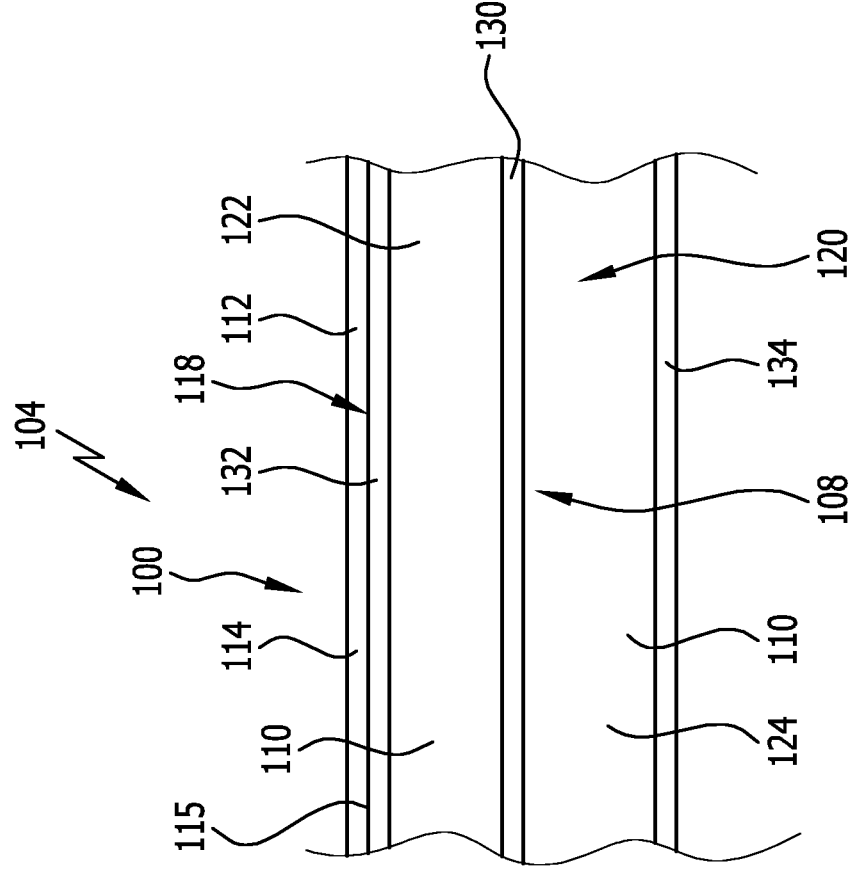
FIG. 4 shows a detail of a schematic sectional view of a
further embodiment of a component in which the base
element comprises a first layer element and a second layer
element, which are separated from one another by a sepa-
rating layer element, wherein the separating layer element
comprises or is made of a foil, for example of a polymer
material.

A further embodiment of a component 100 shown in FIG. 4 differs substantially in its structure and function from the embodiment shown in FIG. 3 in that the sandwich element 120 comprises a separating layer element 130 as core element 126.

The separating layer element 130 is preferably a foil, in particular a substantially diffusion-resistant foil. The separating layer element 130, for example, comprises or is made of one or more of the following materials: polyolefin, for example polypropylene, thermoplastic elastomer, ethylene-propylene-diene rubber.

An element, in particular an element with an s d value of 1500 m or more, is preferably referred to as "diffusion-resistant." The s d value is determined in particular in accordance with DIN 4108-3 (October 2018).

By means of the separating layer element 130, an improved seal can be formed even during processing, for example production and/or assembly of the component. For example, due to the separating layer element 130, the component 100 has an improved cooling behavior and/or an optimized resistance to mechanical stresses.

It may be provided that the sandwich element 120 comprises a third layer element 132 and/or a fourth layer element 134. The third layer element 132 is preferably arranged on a side of the first layer element 122 facing away from the separating layer element 130. In particular, the fourth layer element 134 is arranged on a side of the second layer element 124 facing away from the separating layer element 130.

For example, it is conceivable that the component 100 is a semi-finished product and/or is manufactured in-line.

The first layer element 122 preferably comprises or is made of a first composite element 110. For example, the first layer element 122 comprises a non-woven material and a fiber material. In accordance with a preferred embodiment, the first layer element 122 is a polypropylene non-woven material having a glass fiber core.

The second layer element 124 preferably comprises a non-woven material, in particular, a polyester, for example polyethylene terephthalate, or a polyolefin, for example polypropylene or mixtures thereof. It may be advantageous if the second layer element 124 is fiber-free.

The third layer element 132 is, for example, a foil made of a non-woven material.

For example, the fourth layer element 134 is a scrim material and/or an adhesive material. A scrim material is preferably a woven material, for example a gauze material.

One or more of the following elements can have a non-combustible and/or fire-retardant component or can be designed to be completely non-combustible and/or fire-resistant:

the shielding element 112; and/or
the first layer element 122; and/or
the second layer element 124; and/or
the separating layer element 130; and/or
the third layer element 132; and/or
the fourth layer element 134.

In particular, the third layer element 132 and/or the fourth layer element 134 serve to functionalize the component 100, for example with regard to one or more of the following properties and/or functions: sealing, acoustics, adhesive bonding.

Otherwise, the further embodiment of a component shown in FIG. 4 essentially corresponds in its structure and function to the embodiment shown in FIG. 3 so that reference is made to its description in this respect.

Figure 5:
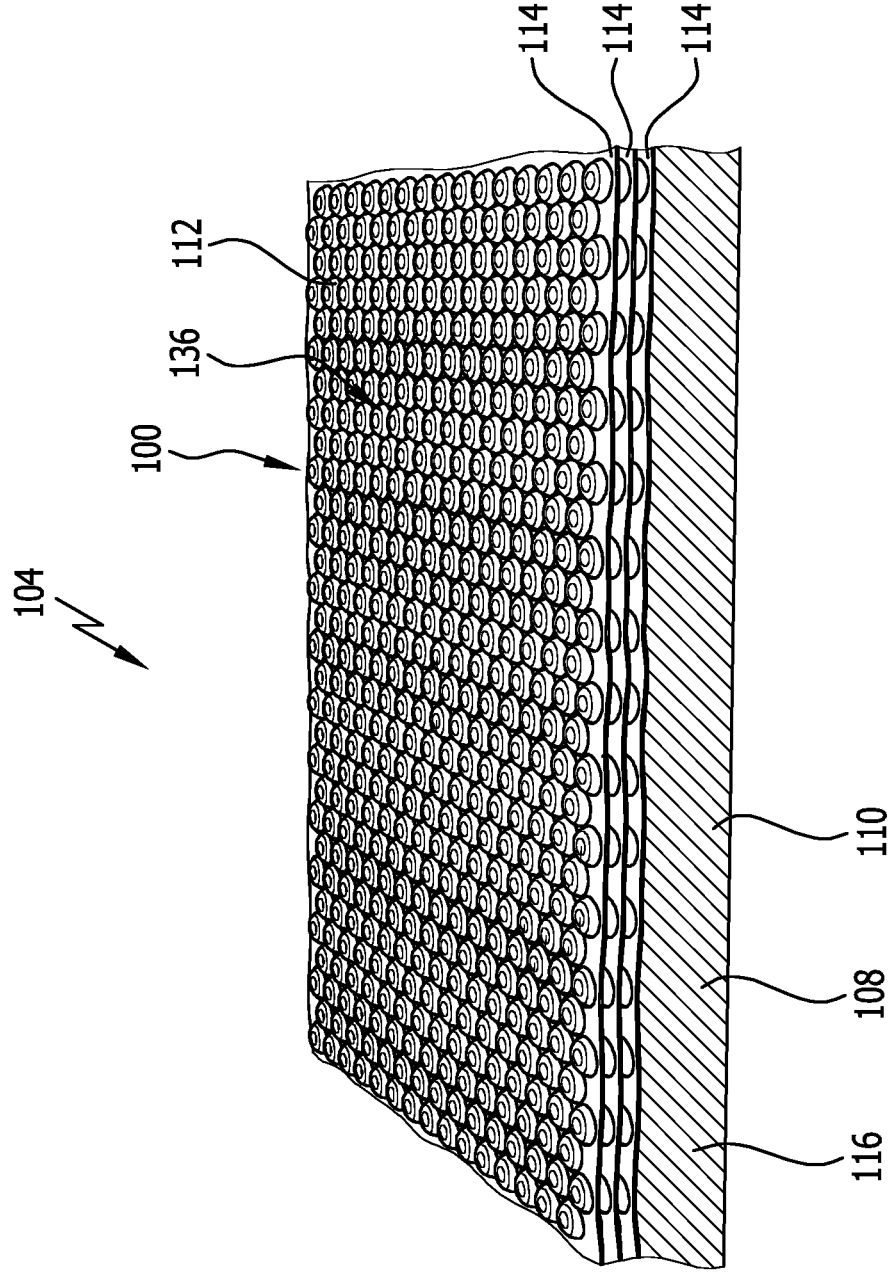
FIG. 5 shows a schematic perspective view of a further
embodiment of a component in which the shielding element
comprises a plurality of foils.

A further embodiment of a component 100 shown in FIG. 5 essentially differs in its structure and function from the embodiment shown in FIGS. 1 and 2 in that the shielding element 122 comprises a plurality of foils 114, for example in the form of a foil package 136.

In the present case, the shielding element 112 comprises three foils 114. In accordance with alternative embodiments, the number of foils 114 may vary.

For example, the plurality of foils 114 comprise or are made of an aluminum alloy.

It may be provided that the plurality of foils 114 are not planar in form and, for example, have regularly arranged elevations and/or depressions in directions extending perpendicularly to a main extension plane of the respective foil 114.

For example, the plurality of foils 114 each have regularly arranged bulges.

In order to produce the embodiment of the component 100 shown in FIG. 5, it may be provided that the plurality of foils 114 together with the base element 108 are processed partially or completely in an on-line method. For example, the plurality of foils 114 are heated together with the base element 108 and subsequently and/or meanwhile are formed together as a composite.

Alternatively or additionally, it may be provided that the component 100 is partially or completely processed in an off-line method.

For example, the shielding element 112 in the form of the foil package 136 is fixed to the base element 108 by one or more of the following methods:

riveting; and/or gluing; and/or stapling; and/or joining, for example, toxing and/or crimping.

Otherwise, the further embodiment of a component 100 shown in FIG. 5 essentially corresponds in its structure and function to the embodiment shown in FIGS. 1 and 2 so that reference is made to their description in this respect.

As a result of the above-described features of the component 100, a component with a reduced weight can be formed, which is insulating on the inside and shielding on the outside. For example, a lightweight battery cover can be formed, which is insulating on the inside and shielding on the outside.

The invention claimed is:

1. A component, wherein the component comprises the following:

a base element which comprises or is made of at least one composite element, wherein at least one of the at least one composite elements comprises or is made of a polymer matrix material and a fiber material, wherein the base element is a sandwich element comprising or made of a separating layer element, a first layer element and a second layer element, the separating layer element being arranged between the first layer element and the second layer element;

a shielding element for electrically and/or electromagnetically shielding the component, wherein the shielding element comprises or is made of one or more foils and is connected to the base element, wherein the shielding element is connected to the base element via a connecting element of the component, wherein the connecting element comprises or is made of a first polymer material, wherein a melting point of the first polymer material of the connecting element is at least approximately 10° C. lower than a melting point of the polymer matrix material of at least one or all of the composite elements, wherein the first polymer material comprises or is made of a thermoplastically processable polymer material, and wherein the thermoplastically processable polymer material comprises or is made of a random copolymer polypropylene.

2. The component in accordance with claim 1, wherein the fiber material is an endless fiber material and/or a long fiber material.

3. The component in accordance with claim 1, wherein the shielding element comprises or is made of aluminum or an aluminum alloy.

4. The component in accordance with claim 1, wherein the shielding element has an average thickness of approximately 0.02 mm or more and/or approximately 1.2 mm or less.

5. The component in accordance with claim 1, wherein the connecting element is an adhesive layer.

6. The component in accordance with claim 1, wherein the component is a part of a housing of a battery module; and/or a part of a housing of a battery cell and/or a vehicle underbody or a part thereof.

7. The component in accordance with claim 1, wherein the separating layer element is a core element.

8. The component in accordance with claim 1, wherein the separating layer element is a foil and/or wherein the separating layer element comprises or is made of one or more of the following materials: polyolefin, thermoplastic elastomer and ethylene-propylene-diene rubber.

9. The component in accordance with claim 1, wherein the shielding element comprises a plurality of foils or a foil package.

10. The component in accordance with claim 1, wherein the polymer matrix material of at least one or all of the composite elements is or comprises a corresponding homopolymer of the random copolymer.

* * * * *